United States Patent
Allen et al.

(10) Patent No.: US 10,586,985 B2
(45) Date of Patent: Mar. 10, 2020

(54) HIGH VOLTAGE LITHIUM ION POSITIVE ELECTRODE MATERIAL

(71) Applicant: Government of the United States, as represented by the Secretary of the Army, Washington, DC (US)

(72) Inventors: Jan L. Allen, Silver Spring, MD (US); Joshua L. Allen, Columbia, MD (US); Samuel A. Delp, III, Silver Spring, MD (US); Jeffrey B. Wolfenstine, Silver Spring, MD (US); T. Richard Jow, Potomac, MD (US)

(73) Assignee: GOVERNMENT OF THE UNITED STATES OF AMERICA, AS REPRESENTED BY THE SECRETARY OF THE ARMY, Aberdeen Proving Ground, MD (US)

( * ) Notice: Subject to any disclaimer, the term of this patent is extended or adjusted under 35 U.S.C. 154(b) by 0 days.

(21) Appl. No.: 16/201,212

(22) Filed: Nov. 27, 2018

(65) Prior Publication Data

US 2019/0245205 A1    Aug. 8, 2019

Related U.S. Application Data

(63) Continuation of application No. 15/099,821, filed on Apr. 15, 2016, now Pat. No. 10,147,946, which is a (Continued)

(51) Int. Cl.
*H01M 4/58* (2010.01)
*H01M 10/0525* (2010.01)
(Continued)

(52) U.S. Cl.
CPC .......... *H01M 4/5825* (2013.01); *H01G 11/46* (2013.01); *H01G 11/50* (2013.01);
(Continued)

(58) Field of Classification Search
None
See application file for complete search history.

(56) References Cited

U.S. PATENT DOCUMENTS

| 7,457,018 B2 | 11/2008 | Armand et al. |
|---|---|---|
| 8,318,352 B2 | 11/2012 | Saidi et al. |

(Continued)

FOREIGN PATENT DOCUMENTS

| CN | 1478310 | 2/2004 |
|---|---|---|
| CN | 1650450 | 8/2005 |

(Continued)

OTHER PUBLICATIONS

European Search Report for Application No. 15168351; 7 pages, dated Oct. 15, 2015.

(Continued)

*Primary Examiner* — Katie L. Hammer
(74) *Attorney, Agent, or Firm* — Baker Botts L.L.P.

(57) ABSTRACT

A positive electrode material having a nominal stoichiometry $Li_{1+y/2}Co_{1-x-y-z-d}Si_zFe_xM_yM'_d(PO_4)_{1+y/2}$ where M is a trivalent cation selected from at least one of Cr, Ti, Al, Mn, Ni, V, Sc, La and/or Ga, M' is a divalent cation selected from at least one of Mn, Ni, Zn, Sr, Cu, Ca and/or Mg, y is within a range of $0<y\leq0.10$ and x is within a range of $0\leq x\leq0.2$. The use of double compositional modification to $LiCoPO_4$ increases the discharge capacity from ~100 mAh/g to about 130 mAh/g while retaining the discharge capacity retention of the singly Fe-substituted $LiCoPO_4$. Additional compositional modification to include Si increases the cycle life and greatly improved the coulombic efficiency to between 97-100% at a C/3 cycle rate.

22 Claims, 10 Drawing Sheets

Related U.S. Application Data continuation of application No. 14/281,924, filed on May 20, 2014, now Pat. No. 9,356,291.

(60) Provisional application No. 61/911,700, filed on Dec. 4, 2013.

(51) Int. Cl.
  *H01G 11/46* (2013.01)
  *H01G 11/50* (2013.01)
  *H01M 4/02* (2006.01)

(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 9,160,001 B2 | 10/2015 | Li et al. |
| 2003/0190526 A1 | 10/2003 | Saidi |
| 2003/0190527 A1 | 10/2003 | Pugh et al. |
| 2005/0202316 A1 | 9/2005 | Hwang et al. |
| 2009/0123813 A1 | 5/2009 | Chiang |
| 2011/0287304 A1 | 11/2011 | Zinck |
| 2012/0273716 A1 | 11/2012 | Li et al. |
| 2012/0321911 A1 | 12/2012 | Watanabe |

FOREIGN PATENT DOCUMENTS

| | | |
|---|---|---|
| CN | 1667865 | 9/2005 |
| CN | 1941490 | 4/2007 |
| CN | 101339994 | 1/2009 |
| CN | 103384931 | 11/2013 |
| WO | 2013/016426 | 1/2013 |

OTHER PUBLICATIONS

Extended European Search Report on European Patent Application No. 17194069.5, dated Dec. 21, 2017; 8 pages.

Office Action received for Chinese Patent Application No. 201510259982.0, dated Apr. 4, 2018; 13 pages.

Office Action received for Chinese Patent Application No. 201510259982.0, dated Jan. 4, 2019, no English translation; 4 pages.

HIGH VOLTAGE LITHIUM ION POSITIVE ELECTRODE MATERIAL

CROSS REFERENCE TO RELATED APPLICATION

This application is a continuation application of U.S. patent application Ser. No. 15/099,821 filed Apr. 15, 2016; which is a continuation application of U.S. patent application Ser. No. 14/281,924 filed May 20, 2014, now U.S. Pat. No. 9,356,291 issued May 31, 2016; which claims the benefit of U.S. Provisional Patent Application No. 61/911,700 filed on 4 Dec. 2013, the complete disclosures of which, in their entirety, are herein incorporated by reference.

GOVERNMENT INTEREST

The invention described herein may be manufactured, used, and licensed by or for the United States Government.

FIELD OF INTEREST

The present invention relates in general to a positive electrode material, and in particular to a high voltage lithium ion positive electrode material.

BACKGROUND $LiFePO_4$ is a Li-ion positive electrode material that has been favored for its strong abuse tolerance which in turn has been attributed to the nature of the oxygen bonding in the phosphate group. Also, it is desirable to harness the abuse tolerance of a phosphate based cathode in a material that stores more energy. One possibility is to look to higher voltage olivines such as $LiMnPO_4$ 4.1 V, $LiCoPO_4$ 4.8 V or $LiNiPO_4$ 5.1V since the stored energy is proportional to the voltage. $LiCoPO_4$ in particular has the potential to increase energy 40% compared to $LiFePO_4$. Furthermore, its electronic structure is more favorable than $LiMnPO_4$ and $LiNiPO_4$ in terms of polaronic conductivity and ability to form polarons, respectively.

However, and even though initial research on $LiCoPO_4$ led to improvements in the rate of discharge, capacity fade has blocked further progress. As such, an improved Li-ion positive electrode material with a high discharge capacity and low capacity fade would be desirable.

SUMMARY

A Li-ion positive electrode material is provided. The material has a nominal stoichiometry of $Li_{1+y/2}Co_{1-x-y-z-d}Si_zFe_xM_yM'_d(PO_4)_{1+y/2}$ where M is a trivalent cation such as Cr, Ti, Al, Mn, Ni, V, Sc, La and/or Ga, M' is a divalent cation such as Mn, Ni, Zn, Sr, Cu, Ca and/or Mg, y is within a range of $0<y\leq0.10$, x is within a range of $0\leq x\leq0.2$, z is within a range of $0\leq z\leq0.1$ and d is within a range of $0\leq d\leq0.20$. In some instances, d is within the range of $0\leq d\leq0.10$, and preferably within the range of $0\leq d\leq0.05$. The Li-ion positive electrode material has an initial capacity of at least 120 mAh/g and a discharge capacity of at least 100 mAh/g after 500 cycles.

In some instances, the positive electrode material has a composition where y is within the range of $0.02\leq y\leq0.08$, x is within the range of $0.05\leq x\leq0.15$ and M=Cr or Ti. In other instances, y is within the range of $0.04\leq y\leq0.06$, x is within the range of $0.08\leq x\leq0.12$ amd M=Cr or Ti. In still other instances, y=0.05, x=0.10 and M=Cr or Ti.

In one embodiment, z and d are equal to zero, and the Li-ion positive electrode material has a nominal stoichiometry of $Li_{1.025}Co_{0.85}Fe_{0.1}Cr_{0.05}(PO_4)_{1.025}$, an initial capacity of at least 125 mAh/g and a discharge capacity of at least 105 mAh/g after 500 cycles.

In another embodiment, d is equal to zero, z is not equal to zero, the positive electrode material contains Si and the Li-ion positive electrode material has a nominal stoichiometry of $Li_{1+y/2}Co_{1-x-y-z}Si_zFe_xM_y(PO_4)_{1+y/2}$ where x and y have the values given above and z is within a range of $0<z\leq0.1$, preferably within a range of $0<z\leq0.05$, and more preferably within a range of $0<z\leq0.02$. In some instances z=0.01. Also, the addition of Si improves the coulombic efficiency of the material and in some instances the coulombic efficiency is between 97-100% at a C/3 cycle rate.

DETAILED DESCRIPTION

Figure 1:
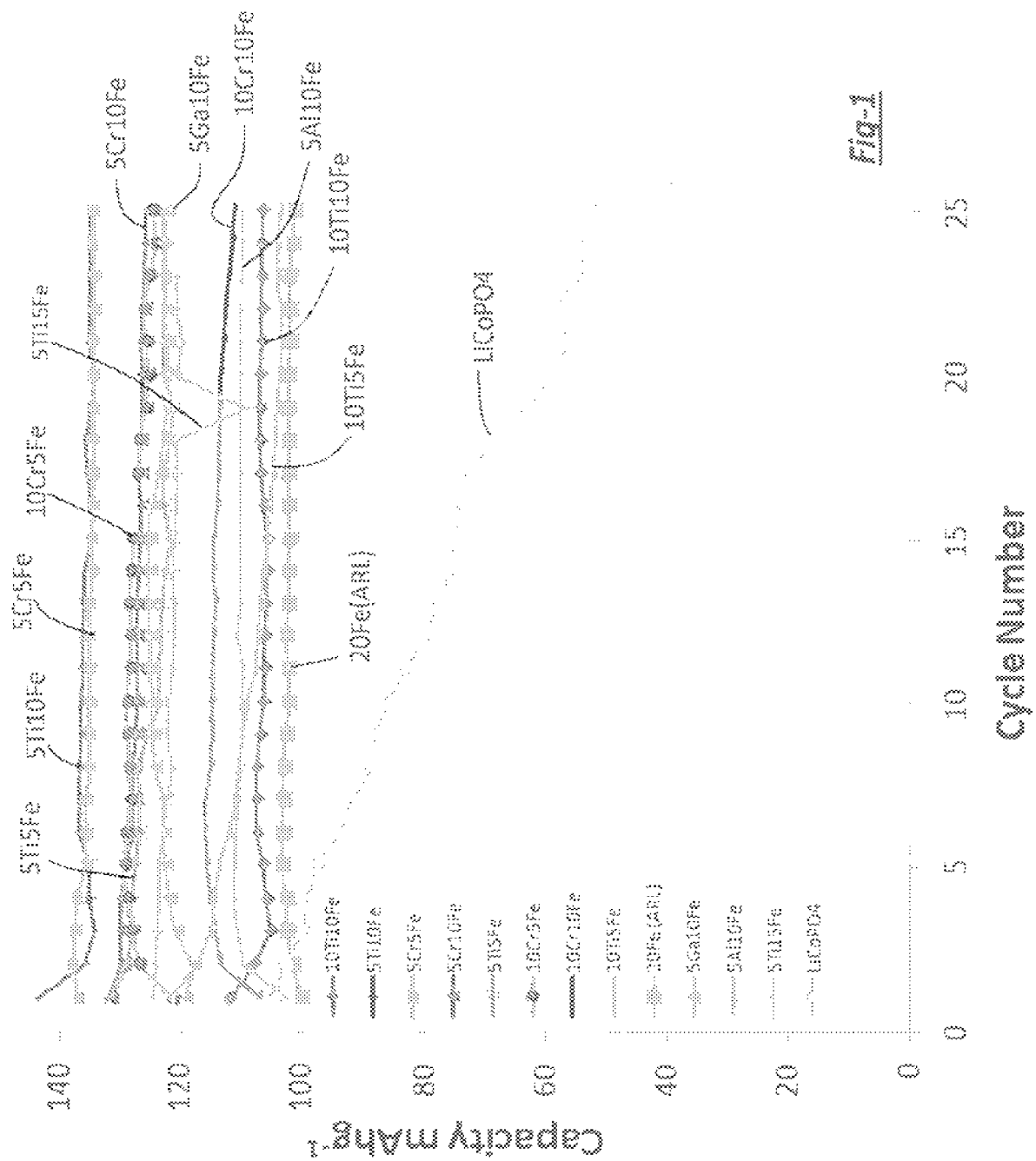
FIG. 1 is a graphical plot of discharge capacity as a function of cycle number for samples of composition $Li_{1+y/2}Co_{1-x-y}Fe_xM_y(PO_4)_{1+y/2}$ with M=Cr, Ti, Al, and Ga, and where 10Ti10Fe represents $Li_{1.05}Co_{0.80}Fe_{0.10}Ti_{0.10}(PO_4)_{1.05}$, 5Ti10Fe represents $Li_{1.025}Co_{0.85}Fe_{0.10}Ti_{0.05}(PO_4)_{1.025}$, etc.

An improved Li-ion positive electrode material with an initial capacity of at least 120 mAh/g and a discharge capacity of at least 100 mAh/g after 500 cycles is provided. In some instances, the improved Li-ion positive electrode material has initial capacity of at least 125 mAh/g and a discharge capacity of at least 105 mAh/g after 500 cycles. In addition, the material can contain Si which provides an coulombic efficiency to between 97-100% at a C/3 cycle rate.

It is appreciated that the improved capacity and dramatically reduced capacity fade is striking relative to LiCoPO$_4$. The use of a double compositional modification increases the discharge capacity from 100 mAh/g to about 130 mAh/g in the most favorable cases for Ti and Fe or Cr and Fe modification of LiCoPO$_4$, while retaining the discharge capacity retention of the singly Fe-substituted LiCoPO$_4$. Additional compositional modification to include Si increases the cycle life and greatly improves the coulombic efficiency to between 97-100% at a C/3 cycle rate.

The material has a nominal stoichiometry of Li$_{1+y/2}$Co$_{1-x-y-z-d}$Si$_z$Fe$_x$M$_y$M'$_d$(PO$_4$)$_{1+y/2}$ where M is a trivalent cation such as Cr, Ti, Al, Mn, Ni, V, Sc, La and/or Ga, M' is a divalent cation such as Mn, Ni, Zn, Sr, Cu, Ca and/or Mg, y is within a range of 0<y<0.10, x is within a range of 0<x<0.2, z is within the range of 0≤z≤0.1 and d is within the range of 0≤d≤0.20. In some instances, y is within the range of 0.02≤y≤0.08, x is within the range of 0.05≤x≤0.15 and M=Cr or Ti. In other instances, y is within the range of 0.04≤y≤0.06, x is within the range of 0.08≤x≤0.12 and M=Cr or Ti. In still other instances, y=0.05, x=0.10 and M=Cr or Ti.

The positive electrode material can also contain Si and the Li-ion positive electrode material can have a nominal stoichiometry of Li$_{1+y/2}$Co$_{1-x-y-z}$Si$_z$Fe$_x$M$_y$(PO$_4$)$_{1+y/2}$ where x and y have the values given above and z is within a range of 0<z≤0.1, preferably within a range of 0<z≤0.05, and more preferably within a range of 0<z≤0.02. In some instances z=0.01.

In order to better teach the invention but not limit its scope in any way, a solid state synthesis method for making the Li$_{1+y/2}$Co$_{1-x-y-z-d}$Si$_z$Fe$_x$M$_y$M'$_d$(PO$_4$)$_{1+y/2}$ material and one or more examples of the inventive material are discussed below.

Samples of Li$_{1+y/2}$Co$_{1-x-y}$Fe$_x$M$_y$M'$_d$(PO$_4$)$_{1+y/2}$ with M=Cr, Ti, Al and/or Ga, 0<y≤0.10 and 0≤x≤0.2 were prepared via a solid state route. Stoichiometric amounts of Co(OH)$_2$, LiH$_2$PO$_4$, Cr$_2$O$_3$, TiO$_2$, Al(OH)$_3$, Ga$_2$O$_3$, FeC$_2$O$_4$·2H$_2$O and/or acetylene black (5 wt. % of final product) were ball-milled for 90 minutes. The mixture was then heated at a heating rate of 10° C. min$^{-1}$ to 700° C. under flowing N$_2$ and then the reactant mixture was held at this temperature for 12 h. Samples of Li$_{1.025}$Co$_{0.84}$Si$_{0.01}$Fe$_{0.10}$M$_{0.05}$(PO$_4$)$_{1.025}$ with M=Cr or Ti were prepared via the same method using Si(OOCCH$_3$)$_4$ as the Si source.

The resulting crystalline phase(s) were identified using X-ray powder diffraction. X-ray data were collected using a Rigaku Ultima III diffractometer. Lattice constants were calculated from peak positions using Rietveld refinement of the pattern collected in a parallel beam geometry. For electrochemical testing, a composite electrode was fabricated by a slurry coating method. Using N-methylpyrrolidone (NMP) as solvent, a slurry was used to coat an Al foil substrate to produce a composite electrode of ca. 80 wt. % active material, 10 wt. % polyvinylidene fluoride (PVDF), 8 wt. % super-P carbon and 2 wt. % conductive carbon nanotube composite (CheapTubes.com). The electrode film was cut into small discs with an area of 0.97 cm$^2$ and dried under an infrared lamp in air before use. In a dry room (Dew point<-50° C.), Li/active coin cells (Hohsen Al-clad CR2032) were assembled using 3 layers of Celgard® 2400 as the separator and a 1.0 molal LiPF$_6$ solution in a 3:7 (wt. %) mixture of ethylene carbonate (EC) and ethyl methyl carbonate (EMC) electrolyte with 1 wt. % HFiP. Also, 100-150 μL of electrolyte was used per coin cell and electrochemical testing was performed using a Maccor Series 4000 tester. For calculation of C-rate, a capacity of ~150 mA h g$^{-1}$ was assumed.

Substitution of elements in addition to Fe for Co, including Cr, Ti, Al and Ga, increased the discharge capacity of Fe-substituted LiCoPO$_4$ while maintaining long cycle life. Not being bound by theory, a nominal stoichiometry, Li$_{1+y/2}$Co$_{1-x-y}$Fe$_x$M$_y$(PO$_4$)$_{1+y/2}$, (M=Cr, Ti, Al and/or Ga) that favors substitution on the Co site and cation vacancies exhibited favorable performance since substitution on the Li site blocks Li-ion conduction. In addition, the above stoichiometry favors the presence of cation vacancies that might enhance Li-ion conductivity.

Turning now to FIG. 1, capacity as a function of cycle for a number of different compositions are shown. The Ti,Fe and Cr,Fe double modifications exhibited the most favorable discharge capacity and cycle life. Furthermore, a composition level was discovered to be 0.10 for Fe and 0.05 for Ti or Cr. All samples exhibited superior cycle life compared to LiCoPO$_4$ and increased discharge capacity relative to singly Fe-substituted LiCoPO$_4$—labeled 20Fe(ARL) in the figure and corresponds to nominal stoichiometry of LiCo$_{0.8}$Fe$_{0.2}$PO$_4$).

Figure 2:
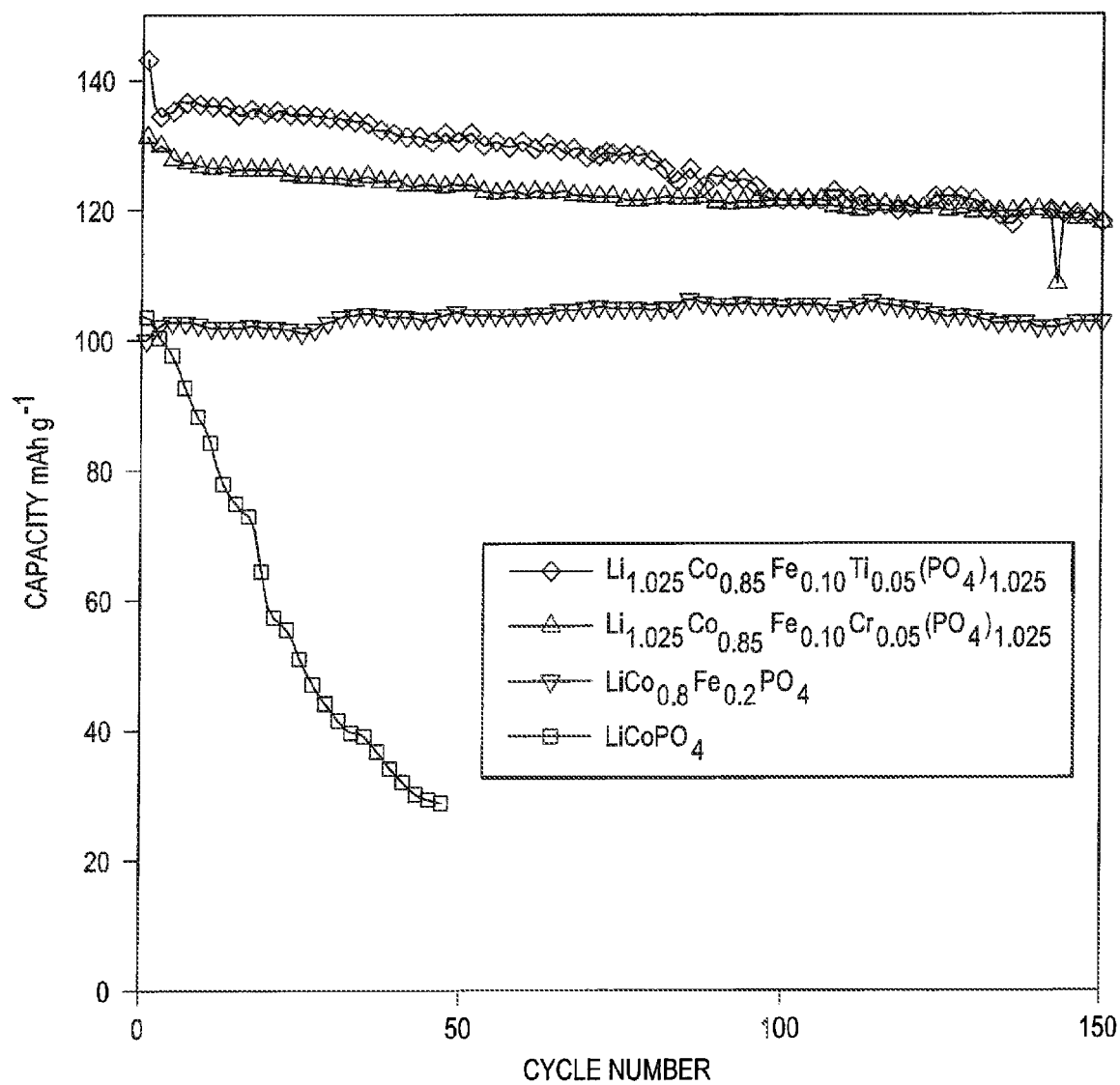
FIG. 2 is a graphical plot of discharge capacity as a function of cycle number for materials according to an embodiment of the present invention.

FIG. 2 demonstrates the effect of Ti,Fe and Cr,Fe double compositional modifications on the capacity fade at the optimized dopant level of 0.10 Fe and 0.05 Ti or Cr. All samples including the un-substituted LiCoPO$_4$ control sample were cycled between 3.5 and 5 V using 1 M LiPF$_6$ in 3:7 by weight ethylene carbonate:ethyl methyl carbonate electrolyte containing 1 wt. % HFiP electrolyte additive. Cells were charged using a C/3 constant current to 5 V followed by a constant voltage of 5 V until the current was less than C/15. It is appreciated that the terms "C", "C/3", "C/15", etc., refer to the C-rate used by the battery industry to scale the charge and discharge current of a battery. For example, a 1,000 mAh battery discharged at a 1 C rate ideally provides a current of 1,000 mA for one hour, whereas a C/2 discharge rate for a 1,000 mAh battery ideally provides a current of 500 mA for two hours.

As shown in FIG. 2, the un-substituted LiCoPO$_4$ control sample exhibited severe capacity fade. However, the Fe-substitution into LiCoPO$_4$ (nominal LiCo$_{0.08}$Fe$_{0.2}$PO$_4$) had a significant reduction in capacity fade relative to the un-substituted LiCoPO$_4$. Also, increasing the discharge capacity by further composition modification with another element in addition to Fe is shown. For example, the Li$_{1.025}$Co$_{0.85}$Fe$_{0.10}$Cr$_{0.05}$(PO$_4$)$_{1.025}$ sample showed better capacity retention with cycling despite having a slightly smaller initial discharge capacity than Li$_{1.025}$Co$_{0.85}$Fe$_{0.10}$Ti$_{0.05}$(PO$_4$)$_{1.025}$.

Figure 3:
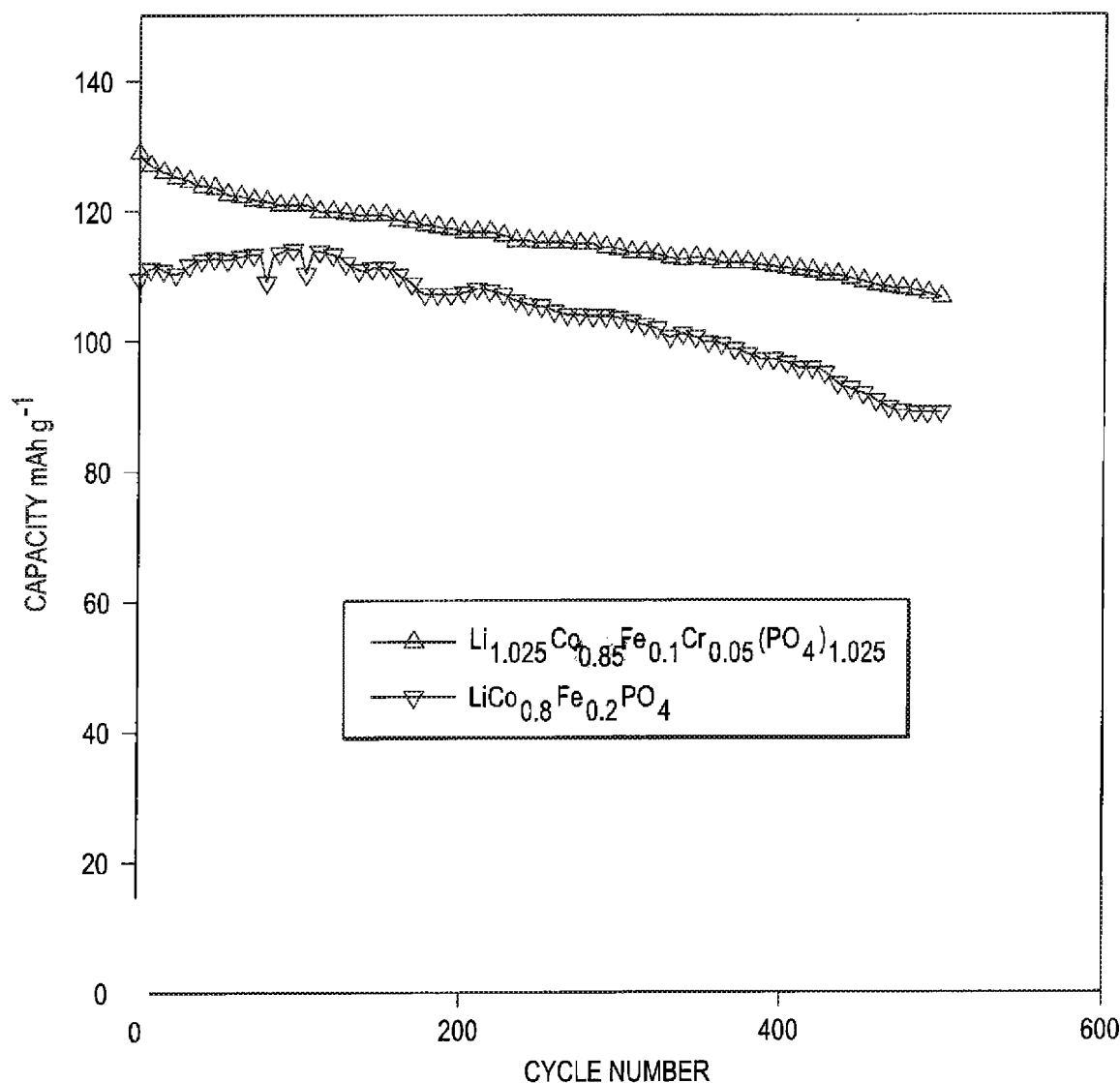
FIG. 3 is a graphical illustration of long term discharge capacity as a function of cycle number for materials according to an embodiment of the present invention.

FIG. 3 compares the long term cycling of composition Li$_{1.025}$Co$_{0.85}$Fe$_{0.10}$Cr$_{0.05}$(PO$_4$)$_{1.025}$ relative to LiCo$_{0.8}$Fe$_{0.2}$PO$_4$. The Fe-substituted LiCoPO$_4$ retained about 80% of its capacity at the 500th cycle (89 of 108 mAh g$^{-1}$ initial capacity). The Cr and Fe-doubly substituted LiCoPO$_4$ had an initial capacity higher than Fe substituted LiCoPO$_4$, but also retained about 80% of capacity at the 500$^{th}$ cycle (107 of 131 mAh g$^{-1}$ initial capacity).

Figure 4:
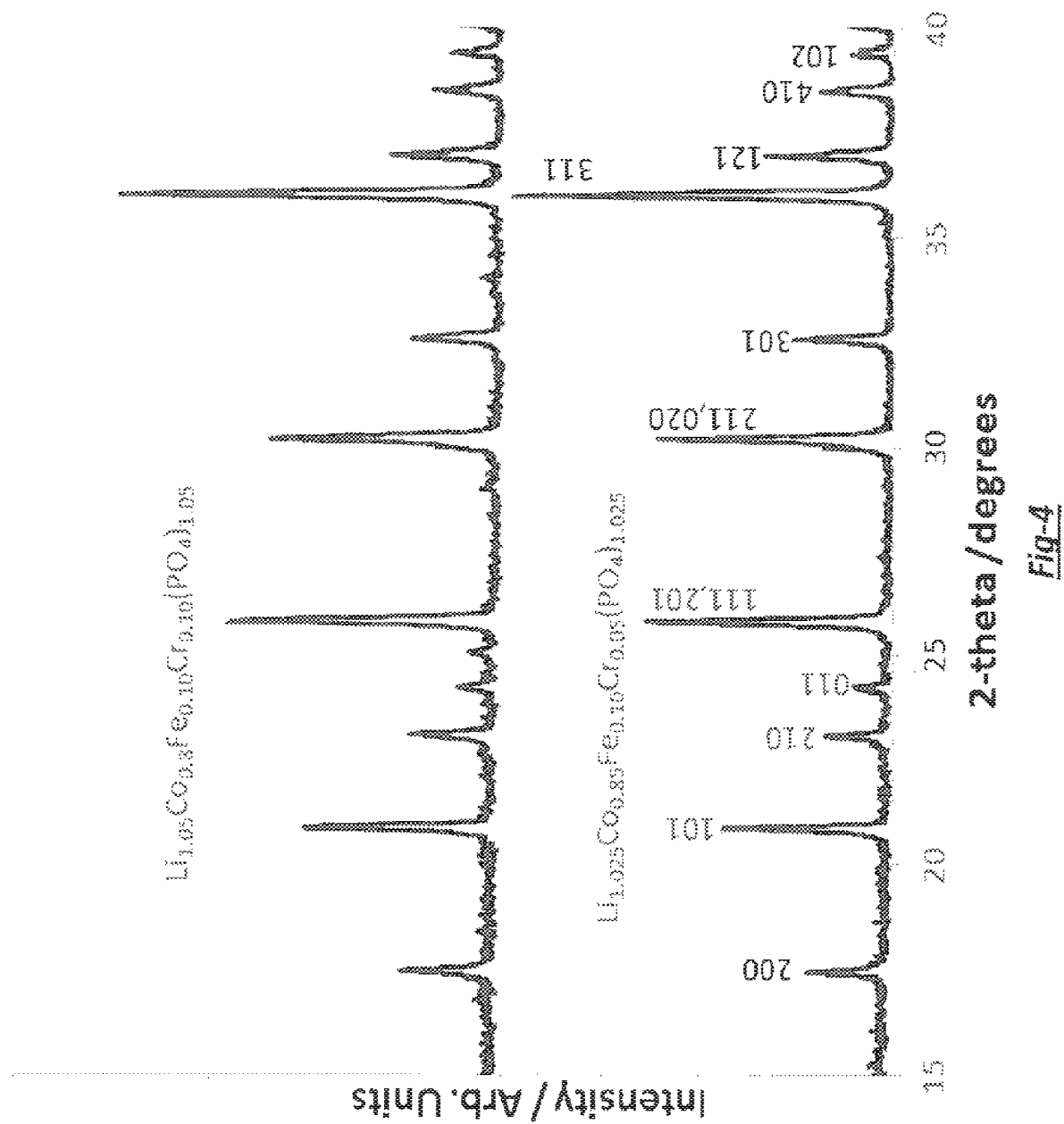
FIG. 4 is a graphical plot of X-ray powder diffraction patterns for $Li_{1.05}Co_{0.08}Fe_{0.10}Cr_{0.10}(PO_4)_{1.05}$ (Top) and $Li_{1.025}Co_{0.85}Fe_{0.10}Cr_{0.05}(PO_4)_{1.025}$ (Bottom), with the peaks labeled with the Miller indices of the phospho-olivine structure, Pnma spacegroup.

FIG. 4 is a comparison the XRD patterns of Li$_{1+y/2}$Co$_{0.90-y}$Fe$_{0.10}$Cr$_y$(PO$_4$)$_{1+y/2}$ where y=0.05 and 0.10. As observed in the lower XRD pattern, Li$_{1.025}$Co$_{0.85}$Fe$_{0.10}$Cr$_{0.05}$(PO$_4$)$_{1.025}$ forms a phospho-olivine structure without other XRD detectable phases. The pattern can be indexed to the phospho-olivine structure confirming that a single phase was present. From Rietveld analysis of the X-ray diffraction data, the unit cell volume of Li$_{1.025}$Co$_{0.85}$Fe$_{0.10}$Cr$_{0.05}$(PO$_4$)$_{1.025}$ was determined to be 282.9 Å$^3$. Also, the lattice parameters are listed in Table 1 below with comparison to LiCoPO$_4$ [11] and LiCo$_{0.9}$Fe$_{0.1}$PO$_4$ [12]. The unit cell volumes of LiCoPO$_4$ and LiCo$_{0.9}$Fe$_{0.1}$PO$_4$ are 284.3 Å$^3$ and 285.1 Å$^3$, respectively. This decrease in unit cell volume for Li$_{1.025}$Co$_{0.85}$Fe$_{0.10}$Cr$_{0.05}$(PO$_4$)$_{1.025}$ is consistent with the substitution of the considerably smaller 6-coordinate Cr$^{3+}$ (effective ionic radius=0.615 Å [13]) for Co$^{2+}$ (effective ionic radius=0.745 Å [13]) and Fe$^{2+}$ (effective ionic radius=0.780 Å [13]), and the presence of cation vacancies which are required to maintain charge neutrality. The decrease in unit cell volume for the Cr,Fe substituted LiCoPO$_4$ results from a decrease in the a and b lattice parameters with little change in the c parameter.

Not being bound by theory, improved discharge electrochemical performance may likely result from increased electronic and/or ionic conductivity. The Li-ion conductivity is, of course, a function of the Li-ion concentration and the Li-ion mobility. Since there is little difference in the Li-ion concentration between the modified LiCoPO$_4$ and the unmodified LiCoPO$_4$, the increased Li-ion mobility is a likely hypothesis for the improvement in discharge capacity and rate capability (rate shown in FIG. 6) of Cr,Fe-substituted LiCoPO$_4$ relative to LiCoPO$_4$.

The LiTi$_2$(PO$_4$)$_3$-like phase has the NASICON structure and it is known to be an excellent Li-ion conductor as a result of the structural characteristics of the NASICON structure which favor high Li-ionic conductivity. Furthermore, the interface of two Li-ion conducting materials can lead to orders of magnitude increased Li-ion conductivity on both sides of the interface through a synergistic effect.

Figure 6:
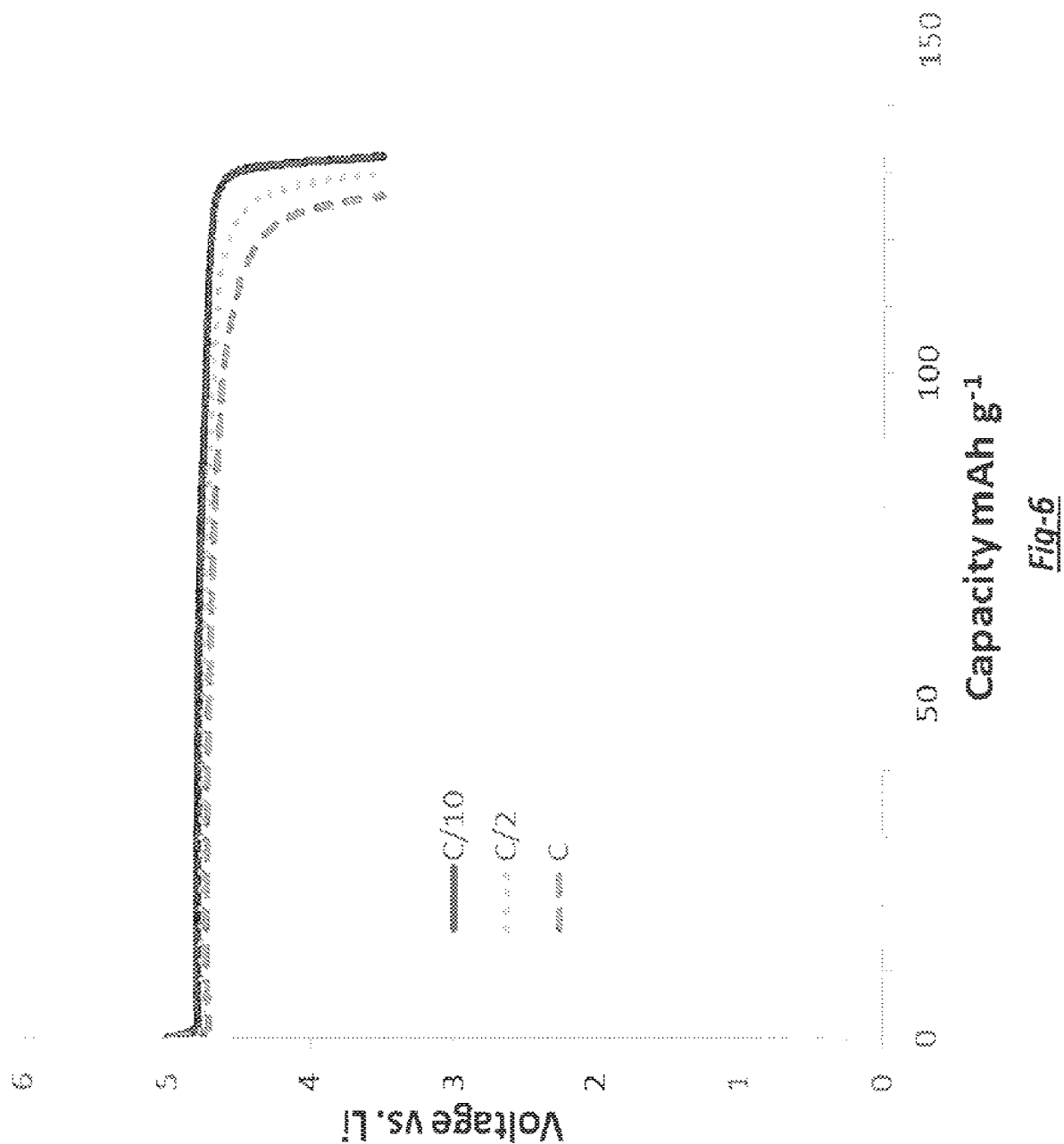
FIG. 6 is a graphical plot of voltage versus discharge capacity of $Li_{1.025}Co_{0.85}Fe_{0.10}Cr_{0.05}(PO_4)_{1.025}$ as a function of rate.

Having shown the improvements in capacity fade because of double compositional modifications of LiCoPO$_4$, the favorable effects of composition modification on the capacity of Li$_{1.025}$Co$_{0.85}$Fe$_{0.10}$Cr$_{0.05}$(PO$_4$)$_{1.025}$ as a function of rate are shown in FIG. 6. Typical discharge curves at three rates, C/10, C/2 and C are plotted. The capacity at C/10 is about 132 mAh/g. At a 1 C rate the capacity is about 126 mAh/g, thus the material shows an excellent rate capability. The improvements are suggested to result from enhanced Li-ion conduction.

Figure 7:
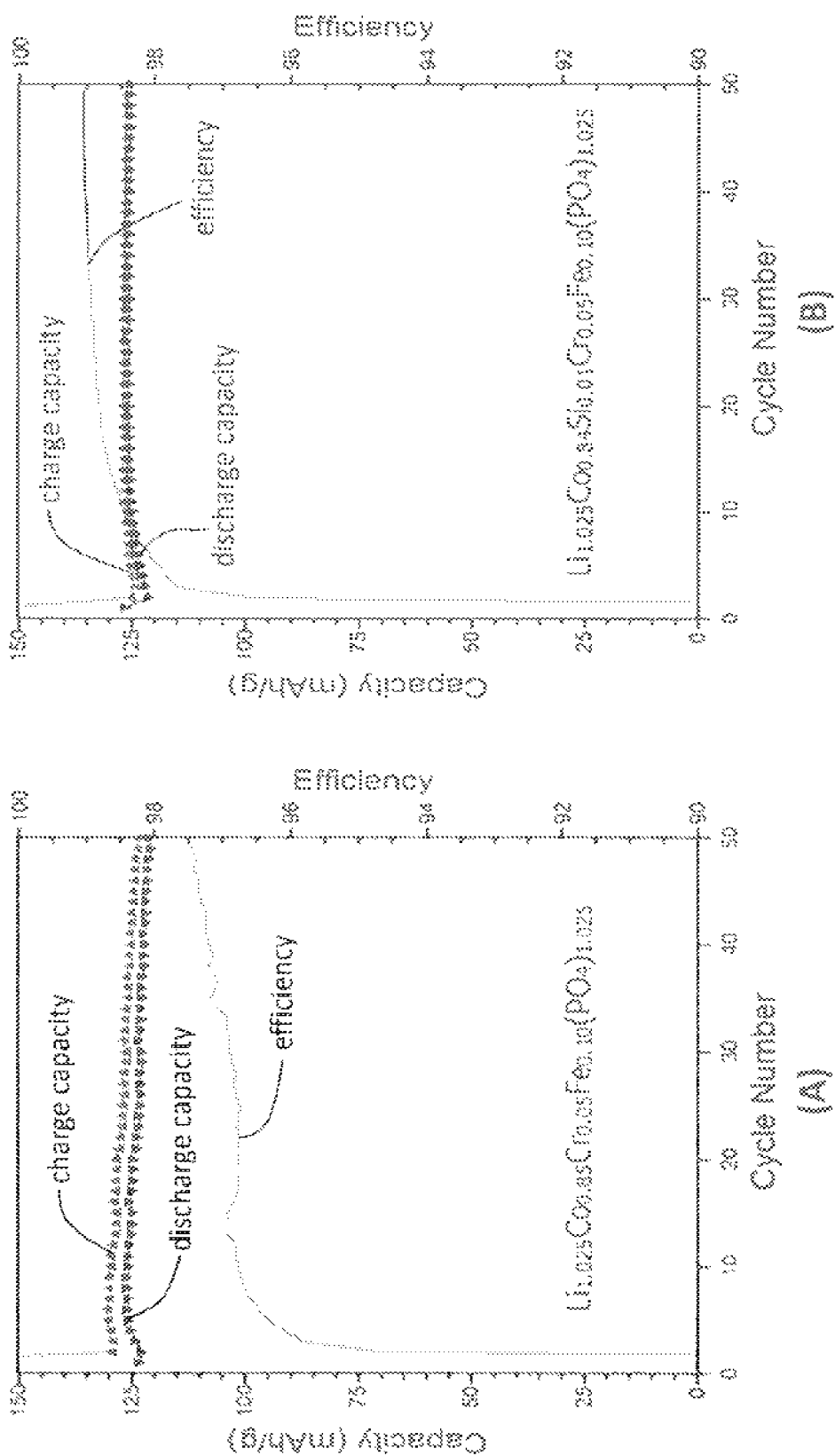
FIG. 7 is a graphical plot of capacity and coulombic efficiency of: (A) $Li_{1.025}Co_{0.85}Fe_{0.10}Cr_{0.05}(PO_4)_{1.025}$; versus (B) $Li_{1.025}Co_{0.84}Si_{0.01}Fe_{0.10}Cr_{0.05}(PO_4)_{1.025}$.

In addition to the above, the coulombic efficiency of the nominal composition of Li$_{1.025}$Co$_{0.84}$Si$_{0.01}$Fe$_{0.10}$M$_{0.05}$(PO$_4$)$_{1.025}$ with M=Cr or Ti was improved by adding Si. The discharge capacity as a function of cycle and cycle life is shown in FIG. 7 for Li$_{1.025}$Co$_{0.84}$Si$_{0.01}$Fe$_{0.10}$Cr$_{0.05}$(PO$_4$)$_{1.025}$ relative to its Si free analog. As shown in the

TABLE 1

| Nominal composition | a (Å) | b (Å) | c (Å) | V (Å$^3$) |
|---|---|---|---|---|
| LiCoPO$_4$ | 10.2048 | 5.9245 | 4.7017 | 284.3 |
| LiCo$_{0.9}$Fe$_{0.1}$PO$_4$ | 10.2175 | 5.9335 | 4.7025 | 285.1 |
| Li$_{1.025}$Co$_{0.85}$Fe$_{0.10}$Cr$_{0.05}$(PO$_4$)$_{1.025}$ | 10.1703 | 5.9204 | 4.6991 | 282.9 |
| Li$_{1.025}$Co$_{0.85}$Fe$_{0.10}$Ti$_{0.05}$(PO$_4$)$_{1.025}$ | 10.2019 | 5.9299 | 4.6976 | 284.2 |
| Li$_{1.025}$Co$_{0.84}$Si$_{0.01}$Fe$_{0.10}$Cr$_{0.05}$(PO$_4$)$_{1.025}$ | 10.2009 | 5.9314 | 4.6999 | 284.4 |
| Li$_{1.025}$Co$_{0.84}$Si$_{0.01}$Fe$_{0.10}$Ti$_{0.05}$(PO$_4$)$_{1.025}$ | 10.2060 | 5.9308 | 4.6986 | 284.4 |

When a higher Cr content was prepared, Li$_{1.05}$Co$_{0.8}$Fe$_{0.10}$Cr$_{0.10}$(PO$_4$)$_{1.05}$, the XRD pattern showed an extra peak around 25 degrees two-theta which matches Li$_9$Cr$_3$P$_8$O$_{29}$. This is in agreement with the electrochemical results which showed an optimal level of 0.05 Cr, since at a higher Cr content a non-electrochemically active second phase (Li$_9$Cr$_3$P$_8$O$_{29}$) appears.

Figure 5:
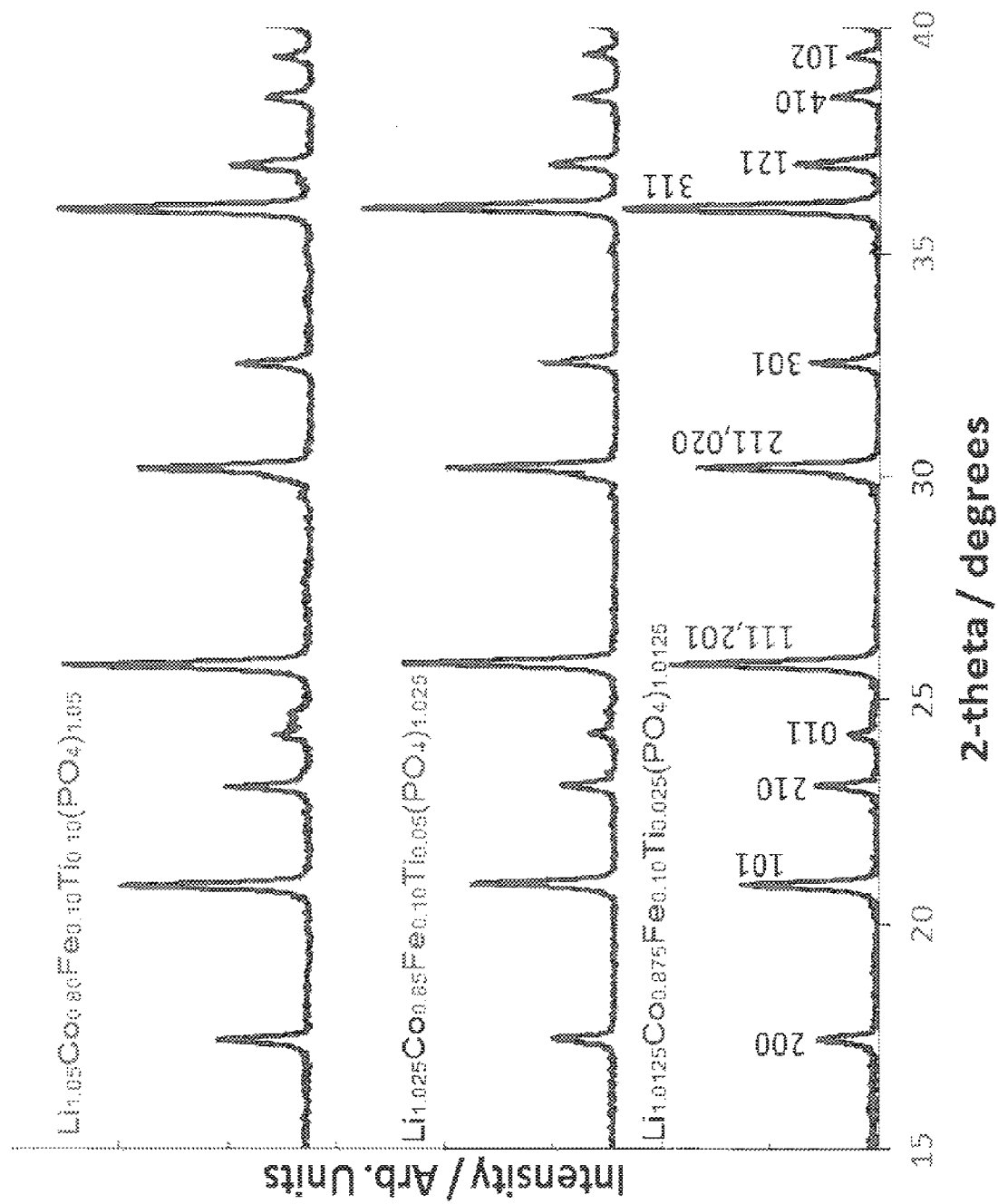
FIG. 5 is a graphical plot of X-ray powder diffraction patterns of $Li_{1.05}Co_{0.08}Fe_{0.10}Ti_{0.10}(PO_4)_{1.05}$ (Top), $Li_{1.025}Co_{0.85}Fe_{0.10}Ti_{0.05}(PO_4)_{1.025}$ (Middle) and $Li_{1.0125}Co_{0.875}Fe_{0.10}Ti_{0.025}(PO_4)_{1.0125}$. (Bottom), with the peaks labeled with the Miller indices of the phospho-olivine structure, Pnma spacegroup.

FIG. 5 compares the XRD patterns of Li$_{1+y/2}$Co$_{0.90-y}$Fe$_{0.10}$Ti$_y$(PO$_4$)$_{1+y/2}$ where y=0.025, 0.05 and 0.10. The pattern matches LiCoPO$_4$ except for a broad peak at approximately 24.5 degrees two-theta which can be assigned to a LiTi$_2$(PO$_4$)$_3$-like phase that is present in all the Ti-containing samples. This secondary phase grows as the Ti level increases. A unit cell volume of Li$_{1.025}$Co$_{0.85}$Fe$_{0.10}$Ti$_{0.05}$(PO$_4$)$_{1.025}$ was determined to be 284.4 Å$^3$. The lattice parameters also are listed in Table 1 with comparison to LiCoPO$_4$ [11] and LiCo$_{0.9}$Fe$_{0.1}$PO$_4$ [12]. The unit cell volumes of LiCoPO$_4$ and LiCo$_{0.9}$Fe$_{0.1}$PO$_4$ are 284.3 Å$^3$ and 285.1 Å$^3$, respectively. The slightly smaller unit cell is consistent with the substitution of either Ti$^{4+}$ (0.65 Å) or Ti$^{3+}$ (0.67 Å) for Co$^{2+}$ (0.745) [13].

Figure 8:
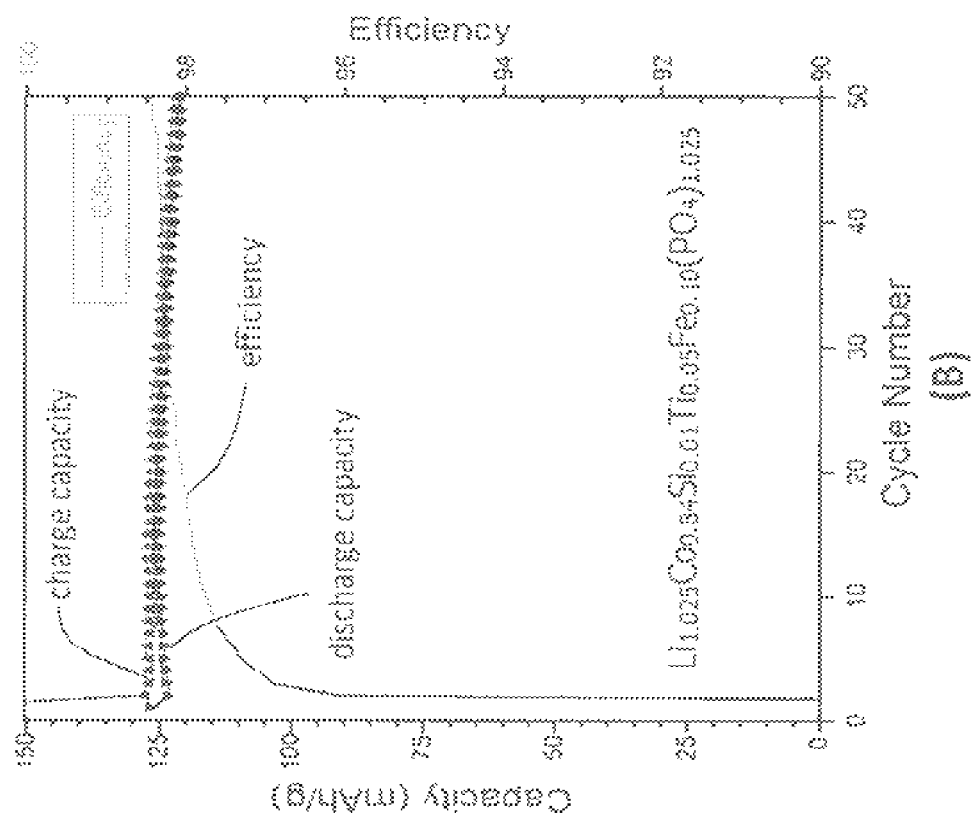
FIG. 8 is a graphical plot of capacity and coulombic efficiency of: (A) $Li_{1.025}Co_{0.85}Fe_{0.10}Ti_{0.05}(PO_4)_{1.025}$; versus (B) $Li_{1.025}Co_{0.84}Si_{0.01}Fe_{0.10}Ti_{0.05}(PO_4)_{1.025}$.
Figure 8:
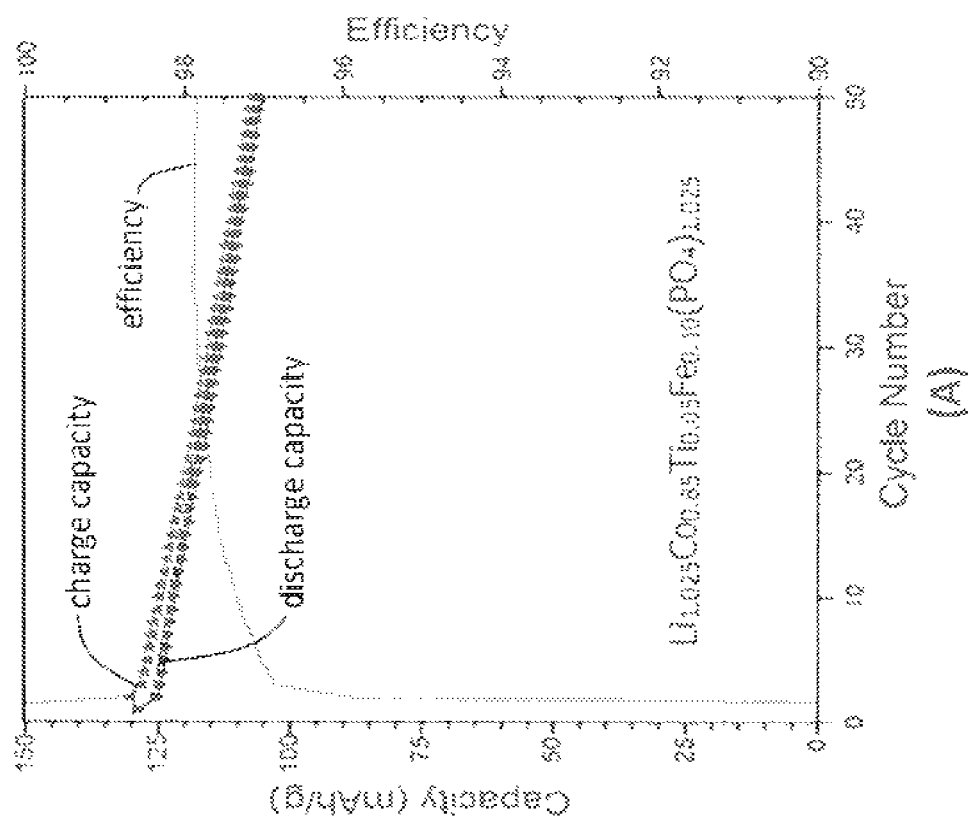

The presence of the secondary LiTi$_2$(PO$_4$)$_3$-like phase suggests that the mechanism to increase the electrochemical performance of Ti,Fe-substituted LiCoPO$_4$ may differ from that of the Cr,Fe substituted LiCoPO$_4$. As previously discussed, at a 0.05 Cr substitution level, a bulk substitution for Co is obtained. In contrast, the Ti, Fe modified LiCoPO$_4$ samples all contain a small fraction of a LiTi$_2$(PO$_4$)$_3$-like phase and we therefore suggest that the improvement in electrochemical performance for Ti,Fe modified LiCoPO$_4$ may result from the beneficial effect this phase has on the Li-ion conductivity of the substituted LiCoPO$_4$.

figure, a significant improvement in the coulombic efficiency and cycle life was observed. Li$_{1.025}$Co$_{0.84}$Si$_{0.01}$Fe$_{0.10}$Ti$_{0.05}$(PO$_4$)$_{1.025}$ showed a similar improvement in coulombic efficiency and an even greater improvement in cycle life as shown in FIG. 8.

Figure 9:
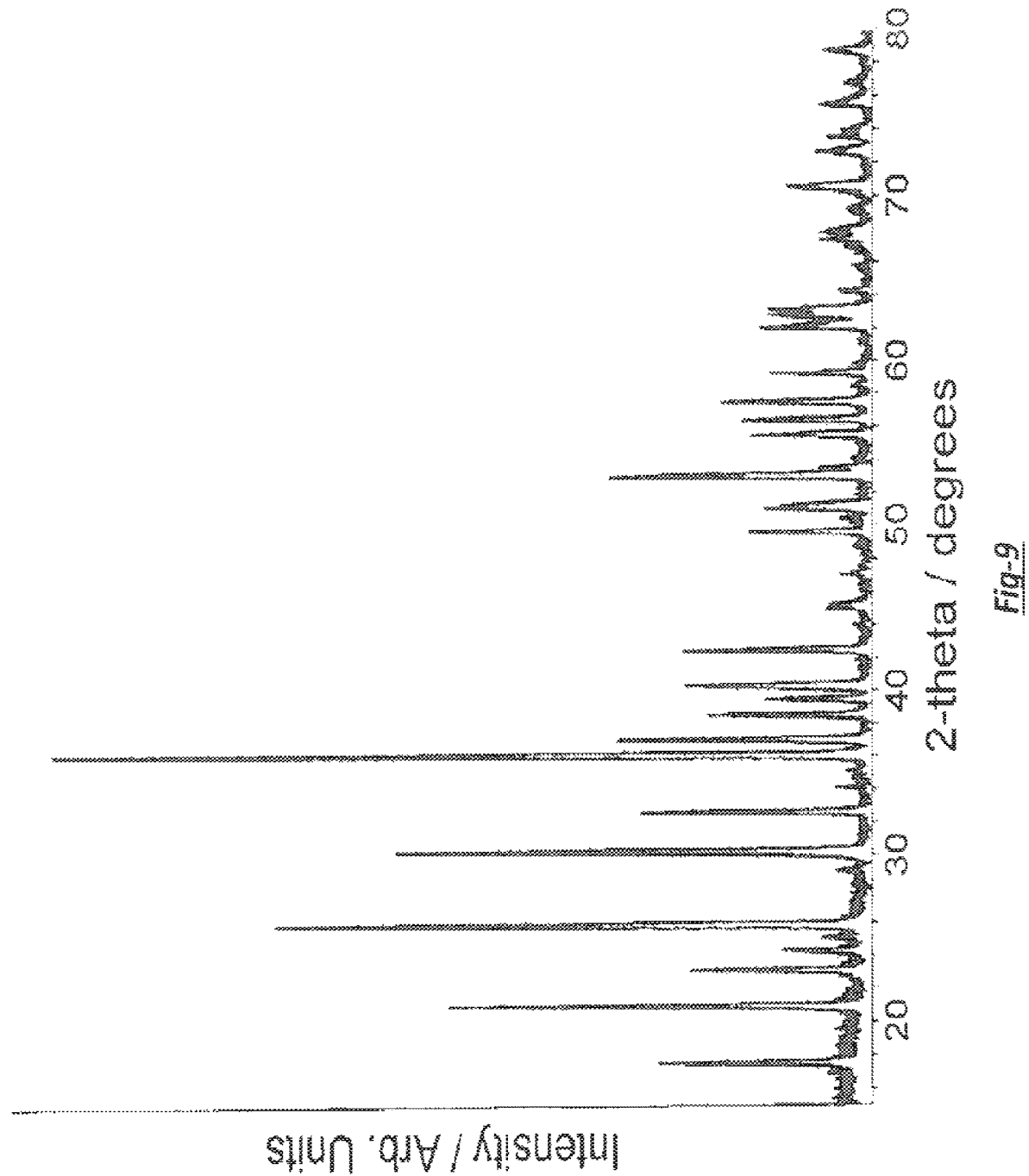
FIG. 9 is a graphical plot of an X-ray powder diffraction pattern of $Li_{1.025}Co_{0.84}Si_{0.01}Fe_{0.10}Cr_{0.05}(PO_4)_{1.025}$.
Figure 10:
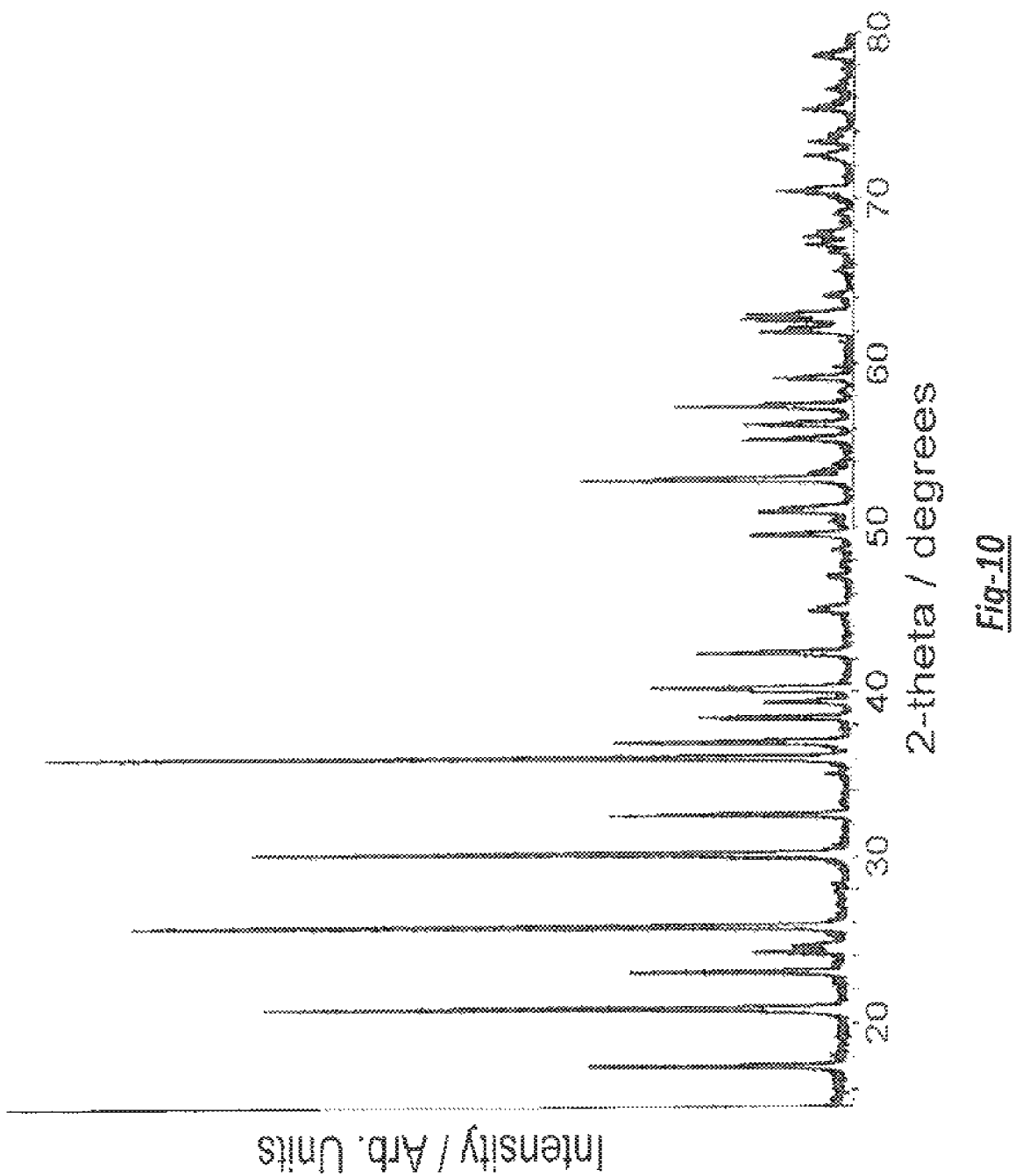
FIG. 10 is a graphical plot of an X-ray powder diffraction pattern of $Li_{1.025}Co_{0.84}Si_{0.01}Fe_{0.10}Ti_{0.05}(PO_4)_{1.025}$.

The x-ray diffraction pattern of the nominal composition Li$_{1.025}$Co$_{0.84}$Si$_{0.01}$Fe$_{0.10}$Cr$_{0.05}$(PO$_4$)$_{1.025}$ is shown in FIG. 9. There is a peak around 25 degrees which does not correspond to the phospho-olivine structure. This might either be Si related or Li$_9$Cr$_3$P$_8$O$_{29}$ as previously discussed. The lattice constants (see Table 1) show a decrease in the unit cell volume relative to LiFe$_{0.10}$Co$_{0.90}$PO$_4$, but the unit cell volume is larger than Li$_{1.025}$Co$_{0.85}$Fe$_{0.10}$Cr$_{0.05}$(PO$_4$)$_{1.025}$, and suggests that inclusion of Si in the starting composition reduces the amount of Cr that can be substituted into LiCoPO$_4$. However the reduced unit cell volume relative to LiFe$_{0.10}$Co$_{0.90}$PO$_4$ indicates that some substitution on the Co lattice site is still occurring. From a crystal chemistry perspective, Cr (effective radius=0.615 Å [13]) is more likely to substitute for Co (effective ionic radius of 0.745 Å [13]) than Si (effective ionic radius of 0.40 Å [13]). The x-ray diffraction pattern of nominal composition Li$_{1.025}$Co$_{0.84}$Si$_{0.01}$Fe$_{0.10}$Ti$_{0.05}$(PO$_4$)$_{1.025}$ is shown in FIG. 10. There is a peak around 24.6 degrees two-theta which does not correspond to the phospho-olivine structure. This peak might be attributed to a Li$_2$Si$_2$O$_5$, but a definitive assignment was not made since only 1 peak is evident and it falls within the same region as the LiTi$_2$(PO$_4$)$_3$-like phase discussed earlier for Ti containing samples. The unit cell volume (Table 1) for this sample was found to be 284.41 Å$^3$, indicating no change from the Si free analog within the uncertainty of the measurement.

Changes and modifications to the teachings disclosed herein will be obvious to those skilled in the art and yet fall within the scope of the present invention. As such, the scope of the invention is defined by the claims and all equivalents thereof.

We claim:

1. A lithium-ion battery, the battery comprising:
    a positive electrode, comprising a compound of formula $Li_{1+y/2}Co_{1-x-y-z-d}Si_zFe_xM_yM'_d(PO_4)_{1+y/2}$ wherein,
    M is a trivalent cation selected from at least one of Cr, Ti, Al, Mn, Ni, V, Sc, La, and/or Ga;
    M' is a divalent cation selected from at least one of Mn, Ni, Zn, Sr, Cu, Ca, and/or Mg;
    y is within a range of $0<y\leq 0.10$;
    x is within a range of $0<x\leq 0.20$;
    z is within a range of $0\leq z\leq 0.10$; and
    d is within a range of $0\leq d\leq 0.20$;
    the positive electrode having an initial capacity of at least 120 mAhg$^{-1}$; and
    a negative electrode; and
    an electrolyte.

2. The battery of claim 1, wherein z=0, y is within the range of $0.02\leq y<0.08$ and x is within the range of $0.05\leq x\leq 0.15$ and M=Cr.

3. The battery of claim 1, wherein y is within the range of $0.04\leq y<0.06$ and x is within the range of $0.08\leq x\leq 0.12$.

4. The battery of claim 1, wherein z=0.

5. The battery of claim 1, wherein d=0.

6. The battery of claim 1, wherein y=0.05 and x=0.10.

7. The battery of claim 1, wherein $0<z\leq 0.10$.

8. The battery of claim 1, wherein $0<d\leq 0.20$.

9. The battery of claim 1, wherein x is within the range of $0.08\leq x\leq 0.12$.

10. The battery of claim 1, wherein y is $0.02\leq y<0.08$.

11. A lithium-ion battery, the battery comprising:
    a positive electrode, comprising a compound of formula $Li_{1+y/2}Co_{1-x-y-z-d}Si_zFe_xM_yM'_d(PO_4)_{1+y/2}$ wherein,
    M is a trivalent cation selected from at least one of Cr, Ti, Al, Mn, Ni, V, Sc, La, and/or Ga;
    M' is a covalent cation selected from at least one of Mn, Ni, Zn, Sr, Cu, Ca, and/or Mg;
    y is within a range of $0<y\leq 0.10$;
    x is within a range of $0<x\leq 0.20$;
    z is within a range of $0\leq z\leq 0.10$; and
    d is within a range of $0\leq d\leq 0.20$;
    the positive electrode having a capacity of at least 100 mAhg$^{-1}$ after 500 cycles; and
    a negative electrode; and
    an electrolyte.

12. The battery of claim 11, wherein z=0, y is within the range of $0.02\leq y<0.08$ and x is within the range of $0.05\leq x\leq 0.15$ and M=Cr.

13. The battery of claim 11, wherein y is within the range of $0.04\leq y<0.06$ and x is within the range of $0.08\leq x\leq 0.12$.

14. The battery of claim 11, wherein z=0.

15. The battery of claim 11, wherein d=0.

16. The battery of claim 11, wherein y=0.05 and x=0.10.

17. The battery of claim 11, wherein $0<z\leq 0.10$.

18. The battery of claim 11, wherein $0<d\leq 0.20$.

19. The battery of claim 11, wherein x is within the range of $0.08\leq x\leq 0.12$.

20. The battery of claim 11, wherein y is $0.02\leq y<0.08$.

21. The battery of claim 11, wherein the positive electrode has a coulombic efficiency between 97-100% at a C/3 cycle rate.

22. The battery of claim 11, wherein the positive electrode has an initial capacity of at least 125 mAhg$^{-1}$.

* * * * *